United States Patent
Williams et al.

(10) Patent No.: US 10,963,687 B1
(45) Date of Patent: Mar. 30, 2021

(54) AUTOMATIC CORRELATION OF ITEMS AND ADAPTATION OF ITEM ATTRIBUTES USING OBJECT RECOGNITION

(71) Applicant: Staples, Inc., Framingham, MA (US)

(72) Inventors: Joseph James Williams, Hopkinton, MA (US); Mary Kathleen Dempsey, Jefferson, MA (US); Olga Bazhenova, Waltham, MA (US); Neil Eric Ringel, Boston, MA (US); Kevin George Hammer, Arvada, CO (US); Mats Jonas Assar Kristensson, Broomfield, CO (US); Derek John Kania, Arvada, CO (US); Faisal Shafait, Islamabad (PK); Muhammad Ali Shahzad, Islamabad (PK); Ali Khan, Islamabad (PK); Nancy Dou, Salem, NH (US)

(73) Assignee: Staples, Inc., Framingham, MA (US)

( * ) Notice: Subject to any disclaimer, the term of this patent is extended or adjusted under 35 U.S.C. 154(b) by 309 days.

(21) Appl. No.: 15/997,568

(22) Filed: Jun. 4, 2018

Related U.S. Application Data

(60) Provisional application No. 62/514,826, filed on Jun. 3, 2017.

(51) Int. Cl.
*G06K 9/34* (2006.01)
*G06K 9/00* (2006.01)
(Continued)

(52) U.S. Cl.
CPC ......... *G06K 9/00456* (2013.01); *G06N 5/046* (2013.01); *G06N 20/00* (2019.01); *G06Q 30/0283* (2013.01); *G06K 2209/015* (2013.01)

(58) Field of Classification Search
CPC .. H04M 1/0266; H04M 1/575; H04M 1/6016; H04M 1/6075; H04M 1/72522;
(Continued)

(56) References Cited

U.S. PATENT DOCUMENTS 6,266,649 B1   7/2001   Linden et al.
6,728,706 B2   4/2004   Aggarwal et al.
(Continued)

OTHER PUBLICATIONS

Aaronson, Jack, Top 3 Ways to Use Product Attributes—ClickZ, Date of download Jan. 29, 2019, Mediaagility.com, Online Article: https://www.clickz.com/top-3-ways-to-use-product-attributes/52756/ 2 pages.
(Continued)

*Primary Examiner* — Charlotte M Baker
(74) *Attorney, Agent, or Firm* — VLP Law Group, LLP

(57) ABSTRACT

The technology includes an example method for parsing data to determine corollary objects and adapt attributes of the corollary objects using the data. In some implementations, the method may include receiving one or more images, performing text recognition to determine recognized text in the one or more images, and determining data cells containing information associated with a first item. The method may then classify one or more of the determined data cells, and may identify key cells in the determined data cells based on the classification of the one or more determined data cells. Correlations between information contained in the key cells and a second item, the second item including an interchangeable item to the first item may be determined, and the method may adjust attributes associated with the second item based on defined parameters and the recognized text.

20 Claims, 13 Drawing Sheets

(51) Int. Cl.
*G06Q 30/02* (2012.01)
*G06N 5/04* (2006.01)
*G06N 20/00* (2019.01)

(58) Field of Classification Search
CPC ......... G06K 9/00456; G06K 2209/015; G06N 20/00; G06N 5/046; G06Q 30/0283
USPC .......................... 382/176; 715/212, 229, 227
See application file for complete search history.

(56) References Cited

U.S. PATENT DOCUMENTS

| | | | |
|---|---|---|---|
| 6,912,505 | B2 | 6/2005 | Linden et al. |
| 7,117,163 | B1 | 10/2006 | Iyer et al. |
| 7,720,720 | B1 | 5/2010 | Sharma et al. |
| 7,734,729 | B2 | 6/2010 | Du et al. |
| 7,809,615 | B2 | 10/2010 | Hui et al. |
| 7,882,427 | B2 * | 2/2011 | Raja ....................... G06Q 40/00 715/212 |
| 8,468,064 | B1 | 6/2013 | Trandal et al. |
| 8,781,916 | B1 | 7/2014 | Buryak |
| 2010/0306080 | A1 | 12/2010 | Trandal et al. |
| 2011/0145732 | A1 | 6/2011 | Brindley |
| 2014/0279249 | A1 | 9/2014 | Westphal |
| 2016/0103923 | A1 | 4/2016 | Thomas et al. |
| 2018/0203836 | A1 * | 7/2018 | Singh ....................... G06N 3/04 |

OTHER PUBLICATIONS

Sharma, Shivani, Personalize Your Customers Journey with Product Recommendations Powered by Google Cloud. Website. Date Downloaded, Jan. 29, 2019. https://www.mediaagility.com/get-started-product-recommendation-ecommerce-google-cloud/ 7 pages.

Geitgey, Adam, Content-Based Recommendations: Recommending Based on Product Attributes. Lynda.com Tutorial, Apr. 10, 2017, https://www.lynda.com/Data-Science-tutorials/Content-based-recommendations-Recommending-based-product-attributes/563030/600814-4.html, 5 pages.

Ghani, Rayid et al., Text Mining for Product Attribute Extraction. ACM SIGKDD Explorations Newsletter, vol. 8, Issue 1. pp. 41-48, Jun. 2006.

Schafer, J. Ben et al., E-Commerce Recommendation Applications, Data Mining and Knowledge Discovery, vol. 5, Issue 1-2, Jan.-Apr. 2001, pp. 115-153.

Google Patent Search, https://patents.google.com/?q=product&q=recommendations&q=%22product+attributes%22, visited Oct. 26, 2017.

* cited by examiner

Figure 4E

AUTOMATIC CORRELATION OF ITEMS AND ADAPTATION OF ITEM ATTRIBUTES USING OBJECT RECOGNITION

CROSS-REFERENCE TO RELATED APPLICATIONS

This application claims the benefit under 35 U.S.C. § 119(e) of U.S. Provisional Application No. 62/514,826, entitled "Automatic Correlation of Items and Adaptation of Item Attributes using Object Recognition," filed on Jun. 3, 2017, the entire contents of which are incorporated herein by reference.

BACKGROUND

The present specification generally relates to a cross referencing and automatically adjusting one or more attributes of items.

Companies may purchase many items of varying types from one or more vendors, but there is currently no way for an administrator at the company to know whether those items have the best value for their company without painstakingly searching for items line-by-line in a database to evaluate the prices, quantities, and types of items offered to the company. This is time consuming and impractical, particularly for large sets of items.

Accordingly, there is a need for more efficient and improved technology for determining and cross-referencing items.

SUMMARY

A system can be configured to perform particular operations or actions by virtue of having software, firmware, hardware, or a combination of them installed on the system that causes the system to perform the actions. One general aspect includes a method including: receiving one or more images; performing text recognition to determine recognized text in the one or more images; determining data cells containing information associated with a first item; classifying one or more of the determined data cells; identifying key cells in the determined data cells based on the classification of the one or more determined data cells; determining correlations between information contained in the key cells and a second item, the second item including an interchangeable item to the first item; and adjusting attributes associated with the second item based on defined parameters and the recognized text.

Implementations may include one or more of the following features. The computer-implemented method further including: receiving user input identifying a portion of the one or more images; and performing the text recognition on the portion of the one or more images to determine the recognized text. The computer-implemented method where classifying the one or more of the determined data cells includes identifying a category of data in the one or more of the determined data cells based on a particular format, the particular format representing an expected layout of information in the one or more images. The computer-implemented method where classifying the one or more of the determined data cells includes identifying a category of data in the one or more of the determined data cells using a neural network trained using a plurality of images and classified data cells. The computer-implemented method where determining correlations between the information contained in the key cells and the second item includes identifying the second item based on the identified key cells. The computer-implemented method where identifying the second item based on the identified key cells includes cross-referencing the information contained in the key cells with information relating to the second item to identify the second item. The computer-implemented method where determining correlations between the information contained in the key cells and the second item includes determining a conversion factor representing a correlation of a first unit of measure of the first item and a second unit of measure of the second item. The computer-implemented method where adjusting attributes associated with the second item includes adjusting a quantity of the second item based on the conversion factor and a quantity of the first item.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4A-4H illustrate features and graphical user interfaces provided by, or in association with, the correlation application for performing operations disclosed herein.

DESCRIPTION

Figure 1:
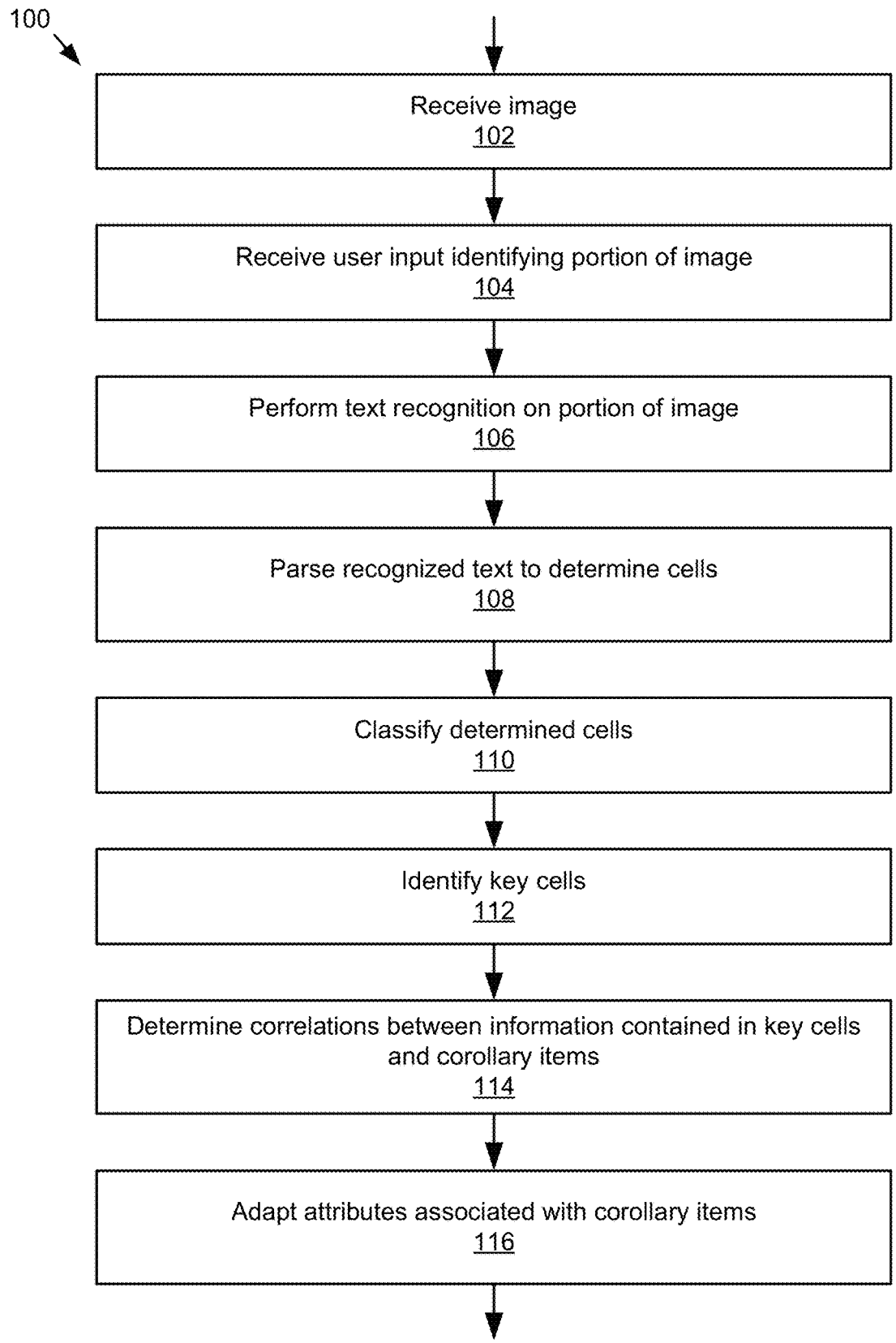
FIG. 1 is a flowchart illustrating an example method for parsing data to automatically determine corollary objects and adapt attributes of the corollary objects using the data.

The present specification generally relates to parsing data to automatically determine corollary objects and adapt attributes of the corollary objects using the data.

The technology disclosed herein includes computing systems, methods, user interfaces, data, and other aspects that extract received items from received data, automatically correlate the received items with available corollary items, and, in some instances, automatically adapt attributes of the corollary items based on the received data. Corollary items may include items that are derived from the received items, such as comparable or substantially equivalent items, for example, that may be interchangeable. In some instances, the received data may be recognized from an image file (e.g., using optical character recognition (OCR)), entered manually, and/or determined from a textual document, for example. In some implementations, the technology may identify items in the received data and use attributes of the identified items to determine available corollary items. The technology may then automatically adjust the attributes of the corollary items based on attributes of the identified items to satisfy defined parameters.

In some implementations, the technology may provide interfaces for scanning or otherwise inputting a competitor invoice (or receipt), cross referencing equivalent items (e.g., to those items on the competitor invoice), generating a quote satisfying defined parameters, and loading the quote into the system for future use and fulfillment. In some implementations, an item may include a virtual or physical product or service. For example, according to some implementations of the technology described herein, the received data may include invoice data identifying particular products and their attributes (e.g., sizes, quantities, colors, prices, configurations, etc.). The technology may identify the received objects and, using attributes of those objects, identify corollary products that are similar. In some instances, the technology may automatically adjust the quantities (and/or other attributes) of the corollary products to match (e.g., within a threshold tolerance) the quantities of the received products. For example, if the product identified in the received invoice is in a package of 20, but the corollary product is only available in a package of 10, the technology may automatically set the quantity or conversion factor of the corollary product to 2 packages. The technology may then determine a competitive price for the corollary product based on parameters, such as prices previously offered for the corollary product, minimum and/or preferred profit margins, or based on factors such as promotional deals, etc. In some instances, the invoice may include multiple products and the technology automatically matches corresponding multiple corollary products. In some implementations, the technology may combine multiple invoices to determine corollary items. The technology may then adjust the pricing, selection of corollary products, and/or other attributes of corollary products to offer a competitive invoice (e.g., a defined percentage of customer savings, with determined benefits, extras, offers, etc.) comparable to the received invoice. It should be understood that while the technology described herein is described in reference to the examples of products, prices, invoices, quantities, etc., the technology can be applied to other fields.

In some implementations, the technology may further streamline the process of providing customer with competitive quotes by reducing the number of meetings typically required to close an account or sale by providing equivalent items available from one source given a competitor item part number, instantly loading quoted prices into a system (e.g., rather than requiring a user to manually or verbally enter an order over the phone or on a website), and quickly convert a competitor invoice or receipt into usable data within a quoting system.

The technology described herein provides numerous benefits including addressing the issues noted in the Background. In some implementations, the technology optimizes identification of fields and data in a document or image using OCR. The technology may determine and adapt correlated data with received and/or recognized data.

The features and advantages described herein are not all-inclusive and many additional features and advantages will be apparent to one or ordinary skill in the art in view of the figures and description. Also, it should be noted that the language used in the specification has been selected for readability and instructional purposes and not to limit the scope of the inventive subject matter.

FIG. 1 is a flowchart illustrating an example method 100 for parsing data to automatically determine corollary objects and adapt attributes of the corollary objects using the data, according to some implementations of the technology described herein. In particular, the method 100 illustrates an example implementation where data pertaining to received items are received in an image, for example, a photograph, scan, printout, PDF, etc., of an invoice. The operations described in FIG. 1 may be further illustrated and described throughout this description.

In some implementations, at 102, a correlation application 536 may receive an image via a data transfer of an image file by a user or via a camera on a client device 606, depending on the implementation. The correlation application 536 (described in further detail in reference to FIG. 5) may include a client-side application, server-side application, or may be distributed across multiple computing systems. In some implementations, the correlation application 536 may be configured to use a camera on a client device 606 to capture an image of an invoice or may receive a file including an image. In some instances, multiple images may be received that include multiple invoices with items from one or more competitive parties. In some implementations, the correlation application 536 may overlay textual or graphical indicators over a live camera display to assist a user in positioning the image at an appropriate distance, lighting, angle, rotation, etc., for the specific subject (e.g., an invoice) of the image. It should be noted that, although some implementations of the techniques described herein include using OCR with images, in some implementations, the technology described herein may be used with manually entered data.

In some implementations, prior to uploading an image and/or other item identification or description, a user may enter certain information, such as a customer number, name, file number, competitor identity, etc., that the correlation application 536 may use to track the image, determine corollary items, increase accuracy in determining data using OCR (e.g., by determining an expected format of an invoice), and/or perform other operations described herein.

In some implementations, at 104, the correlation application 536 may receive user input identifying a portion of the image. For example, the user may select a graphical region of the image which contains items, prices, description, etc., for which to determine corollary items and prices. In some implementations, the correlation application 536 may also receive other input from the user, such as a competitor, that provided the received invoice, manually entered item identifiers, and so forth.

At 106, the correlation application 536 may perform text recognition on the selected portion of the image (or on the entire image), for example, using OCR or other text recognition algorithms. In some implementations, the correlation application 536 may modify the image or selected portion of the image to improve text recognition, for example, by correcting keystone, rotation, coloring, making the image black and white, etc. In some implementations, the correlation application 536 may automatically search for and correct common OCR errors, such as the letter O being switched with the number 0, missing information, or other limitations of text recognition software, especially as those limitations relate to invoices. In some implementations, the correlation application 536 may additionally or alternatively perform image analysis operations, such as those described in reference to FIG. 3.

In some implementations, at 108 and 110, the correlation application 536 may parse the recognized text to determine cells and/or may classify the determined cells. For instance, the correlation application 536 may determine cells of data in the image based on which recognized text indicates an item description, quantity, price, supplier, or other attributes of the item and/or invoice. The correlation application 536 may determine an item identifier (e.g., a stock keeping unit (SKU), description, etc., to identify items). The correlation application 536 may use defined layouts, text fields, items, characters (e.g., dollar symbols), that may be in invoices to improve accuracy of the text recognition and determination of cells. In some implementations, the correlation application 536 generates the cells as or converts the cells to JavaScript Object Notation (JSON) objects for further analysis and use.

In some implementations, the operations at 108 and/or 110 may include keyword search using recognized text, automatic classification using a defined format, or artificial intelligence, for instance.

In some implementations, a keyword search may run recognized text or symbols up against a database of terms to determine and/or classify determined cells. For instance, if recognized text includes the term "SKU:" followed by a string of symbols (e.g., numbers, letters, etc.), the correlation application 536 may determine that the cells are classified as including a SKU. Similarly, if the recognized text includes "quantity" or "QTY" or similar, the correlation application 536 may determine that these cells, or the cells to the right of those symbols, include a quantity of the item (e.g., the cell(s) may be classified as a quantity).

In some implementations, the correlation application 536 may classify the determined data cells including identifying a category of data in the one or more of the determined data cells based on a particular format. For instance, a particular format may representing an expected layout of information in the one or more images. The particular format may be manually selected by the user (e.g., the user may select that an invoice is from company A or that the image contains a receipt of type B) or may be determined using artificial intelligence. For example, the correlation application 536 may train an algorithm based on past data (e.g., chosen invoice formats, determined cells, uploaded images, etc.), which may then be used to automatically identify a format and/or cells in an image (e.g., when the algorithm automatically detects a layout of an invoice in an image). For example, in some implementations, classifying the one or more of the determined data cells may include identifying a category of data (e.g., whether the data includes a price, quantity, description, etc.) in the one or more of the determined data cells using a neural network trained using a plurality of past images and previously classified data cells.

In some implementations, the correlation application 536 may receive input from a user manually tagging the fields or areas of an image to classify data cells (or data columns, rows, etc.). For instance, the correlation application 536 may identify a string of characters, which the user may manually select as containing an item identifier and/or description, such as a brand name and model, SKU, Universal Product Code (UPC), etc. It should be noted that the methods for determining and/or classifying cells may be combined or used when a level of certainty is low. For instance, if the correlation application 536 attempts to use an automated process (e.g., as described above), but fails to classify a cell or otherwise determine certain information from the image, the correlation application 536 may rely one or more secondary methods of classifying, such as receiving manual input from a user.

At 112, the correlation application 536 may identify key cells. For example, the key cells may include those cells identifying the product, quantity, price, and/or other attributes to be used to cross reference corollary items and/or adapt prices or other attributes (e.g., quantity, size, etc.) of those corollary items. For instance, the correlation application 536 may identify the key cells based on their classifications determined above.

At 114, the correlation application 536 may determine correlation(s) between information contained in key cells and available items. For example, the correlation application 536 may identify the items in the invoice, using the recognized text and, in some instances, the classified and/or key cells. For example, if the correlation application 536 identifies an item as Brand X 32 lbs. copy paper, it may match the item against a database using the item identifier and/or attributes to find a corollary item. A corollary item may include, for example, an interchangeable item, such as the same exact item or items with the same or similar attributes that serves a similar purpose. For instance, the correlation application 536 could find corollary items, such as the exact same copy paper, Brand Y copy paper, generic brand 32 lbs. copy paper, etc.

In some implementations, the correlation application 536 may filter or select one or more corollary items from a group of corollary items based on color, vendor, delivery time, preference of a specific customer (e.g., associated with the invoice), administrative preference, profit margin, popularity, profit margin flexibility, discount, promotional discount, cost, similarity to the item recognized in the received invoice, etc.

In some implementations, determining the correlation may include determining a unit of measure conversion factor for converting an attribute of a first item to an attribute of a corollary item. For instance, the received item (e.g., an item recognized from the image, input manually, etc.) may have a first unit of measure associated therewith, while one or more corollary items may have a second unit of measure. For example, determining correlations between the information contained in the key cells and the second item may include determining a conversion factor representing a correlation of a first unit of measure of the first item and a second unit of measure of the second item.

For example, an item identified from an image may be in a box of 10 items, while a corollary item may be available in a box of 2 items, in which case a conversion factor would be 5 (e.g., 5 boxes of the corollary item equals one box of the received item). In another example, a first item may be in a 12 ounce bag, while a second item is in an 18 ounce bag, in which instance, the conversion factor may be, for example, 1.5. In some implementations, the conversion factor may take multiple factors into consideration, such as when a box with a different quantity of different sized packages of an item. It should be noted that other methods of normalizing differences in units of measure and/or other attributes are possible and contemplated and that the conversion factor does not need to be an integer.

In some implementations, determining correlations between the information contained in the key cells and the corollary item may include identifying the corollary item based on the identified key cells. For instance, identifying the corollary item based on the identified key cells may include cross-referencing the information contained in the key cells with information relating to the corollary item to identify the corollary item. In some implementations, determining correlations between information contained in key cells and corollary items may include one or more of the operations described in reference to FIG. 2, such as one or more of the operations at 202-214, although it should be noted that these operations are provided by way of example.

In some implementations, at 116, the correlation application 536 may adapt one or more attributes associated with the one or more of the corollary items. For example, the correlation application 536 may adjust a price of the corollary items individually or as a group in order to, for example, match or improve on the offer (price, delivery, quality of items) in the received invoice.

In some implementations, each item in a database of available items may have associated thereto data representing the flexibility of attributes. For example, the in the case of prices, the data may indicate past prices of an item offered to the same or similar customers, a minimum or preferred price or margin, a standard price, a maximum discount percentage (0%, 5%, 20%, etc.) for the item, promotional discounts, or other parameters defining a pricing for the item. The parameters may also include approval criteria indicating, for instance, a maximum threshold discount that may be offered on a given item (or invoice) before administrative approval is required. The correlation application 536 may adapt the price of a corollary item within these parameters and based on a target savings. The target savings may be an administrator or user defined setting indicating a target amount by which to beat the price of an item, a group of items, or all items on a received invoice.

In some implementations, the target savings may be defined across the items in an invoice so that an offered invoice offers a target savings over the received invoice. For example, some corollary items on an offered invoice may be more aggressively discounted than others due to some items having more flexibility in discounts, promotions/discounts provided by manufactures, etc., in order to hit the target savings and/or maximize profit or revenue for an offered quote or invoice.

Figure 2:
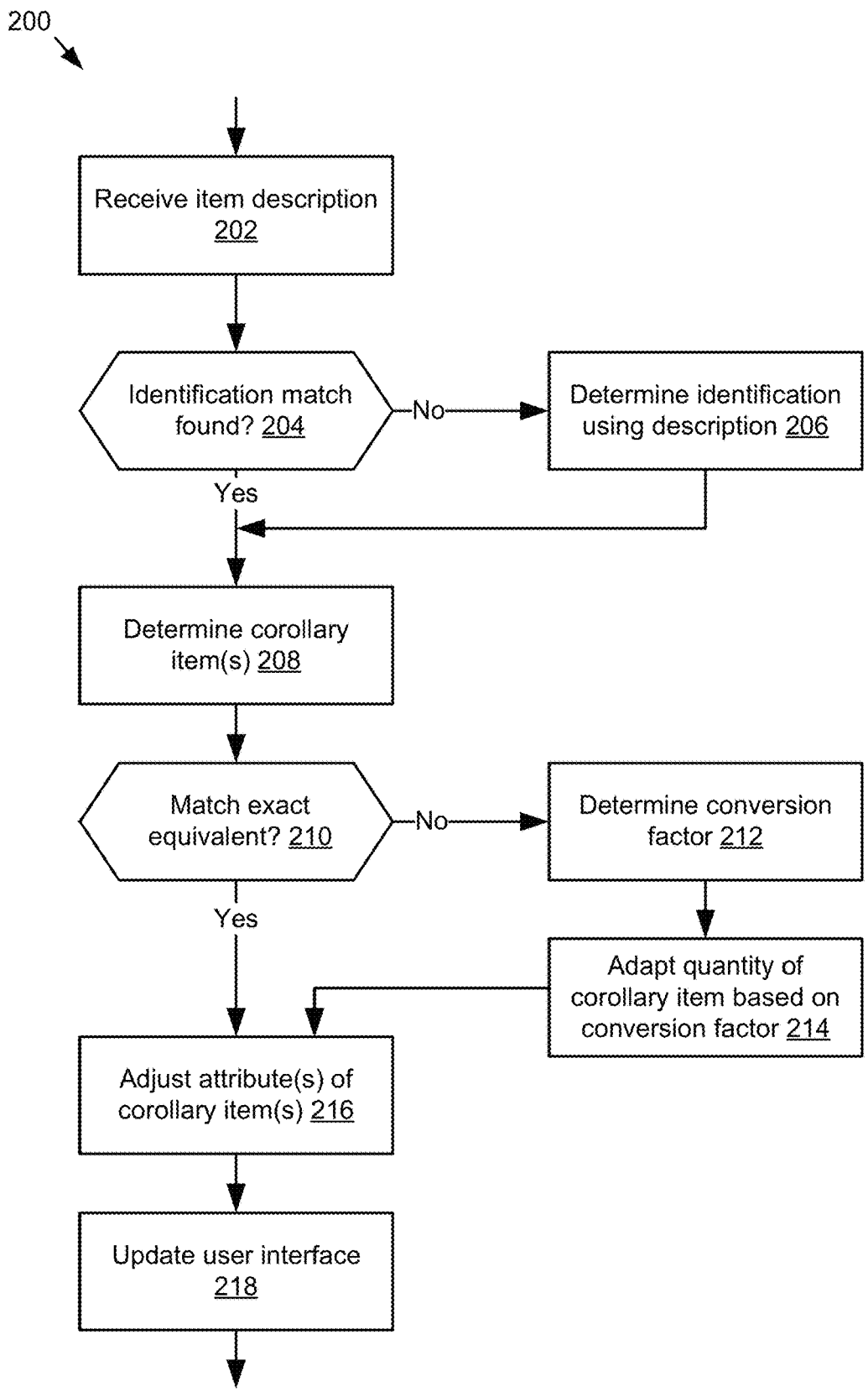
FIG. 2 is a flowchart of an example method for cross-referencing corollary objects and adapting attributes of the corollary objects.

In some implementations, adapting attributes associated with corollary items may include one or more of the operations described in reference to FIG. 2, such as one or more of 216-218, although it should be noted that these operations are provided by way of example.

FIG. 2 is a flowchart of an example method 200 for parsing data to automatically determine corollary objects and adapt attributes of the corollary objects using the data. In some implementations, the method 200 may modify a customer specific price and customer specific quantity for target savings, although other implementations are possible and contemplated herein. It should be noted that although FIG. 2 is described in reference to a single input item, some or all of the operations of the method 200 may be performed for multiple items in an input document and/or for multiple input documents, such as one or more invoices, one or more receipts, one or more images, one or more input data tables, etc.

At 202, the correlation application 536 may receive an item description. For example, the item description may include information that may be used to identify an item, such as a SKU or other item identifier, a brand, a model, a type, etc., as described in further detail elsewhere herein. In some instances, the item description may be received from an image (e.g., using one or more of the operations described in reference to FIGS. 1 and 3), a document (e.g., a table or file with item description data), or manually entered by a user, for example.

In some implementations, as described elsewhere herein, the correlation application 536 may include a graphical interface that allows a user to upload an image or take a photo of a competitor's invoice using a camera or scanner connected with the client device 606. The correlation application 536 may recognize item information in the file and then use the recognized data to cross reference corollary items, for example, using the operations of the method 200.

At 204, the correlation application 536 may determine whether an identification match may be found, for example within a database of item descriptions. For instance, the correlation application 536 may compare the item description with a table of items to see if a match is found. If the correlation application 536 receives a SKU for an item, it may search a table for the SKU to identify the item and, in some instances, corollary items, based on SKUs of corollary items mapped with the SKU in the table or based on attributes of the received SKU, which may be used to determine corollary items. For example, if SKU #1234321 is received, the correlation application 536 may search the database for that number and may, in some instances, use a vendor associated with the SKU to further limit the search. In some implementations, additional data may also be used, such as a party (e.g., a company or supplier) associated with the item identifier to determine an item or set of item attributes represented by the item identifier.

In some implementations, at 206, the correlation application 536 may perform additional analysis to determine an identification for the item using the item description in response to determining that no match was found for an item identifier. For instance, if a SKU or other item identification (e.g., brand, model number, etc.) was recognized in a received image, but not found in the database, the correlation application 536 may attempt to identify the item using one or more secondary means.

For example, in some implementations, the correlation application 536 may perform fuzzy text analysis to determine if there are errors in the received item identifier. For instance, the correlation application 536 may remove or replace the zeros or eights (e.g., numbers that may be miss-recognized by an OCR engine) and search the database again using the resulting string.

In some implementations, the item can be approximately determined. For example, the item description may include information, such as attributes that the correlation application 536 may use to identify the type of item without necessarily identifying the exact item. For instance, an item description (e.g., entered, received in an image, etc.) may indicate that the received item is 32 lb. copy paper, but not the exact quantity, brand, or SKU of the paper.

In some implementations, if the correlation application 536 cannot identify an item or a level of certainty in the determination is below a threshold, the correlation application 536 may output a prompt to the user indicating that a match cannot be found and/or requesting manual input by the user to identify the item.

At 208, the correlation application 536 may determine corollary item(s) based on the identified item. In some implementations, corollary items may be determined by cross referencing the identified item (e.g., an item identifier, etc., as described above) against a database of corollary items. For example, if an exact item identifier (e.g., SKU) is not found in the cross reference, item attributes may be used to search for corollary items. For instance, the correlation application 536 may search a database of corollary items using the item attributes for the received item. If no match is found, the correlation application 536 may search for key words in the item description or a subset of attributes.

In some implementations, the correlation application 536 may identify a plurality of corollary items, which may be sorted based on which of the corollary items is the best match for the received item. For instance, some items may be an exact SKU match, while some items have varying levels of equivalence with the attributes of the retrieved item. For example, a received item may be Brand X, 32 lb. copy paper in a 500 sheet package and corollary items may include: Brand X, 32 lb. copy paper in a 500 sheet package; Brand Y, 32 lb. copy paper in a 500 sheet package; Brand Z, 32 lb. copy paper in a 600 sheet package; and Brand X, 24 lb. copy paper in a 500 sheet package.

In some implementations, the correlation application 536 may determine corollary items using various criteria, such as: a history of matched items (e.g., as stored in a database), companies, or item types; similarity of price, quantity, sizes, or units of measurement; brand names; model numbers; similarity of attributes; etc.

At 210, the correlation application 536 may determine whether the identified input item has a corollary item that is an exact equivalent. In some implementations, the corollary item may be an exact match, such as, for example, if the input item is Brand X, 32 lb. copy paper in a 500 sheet package and the corollary match is Brand X, 32 lb. copy paper in a 500 sheet package. In some implementations, the corollary item may be an exact equivalent where the corollary item may be compared directly with the received item, for example, if the unit of measure, size, or type, etc., is the same (e.g., no conversion factor is necessary to make the comparison). An example of exact equivalents may be that received item is Brand X, 32 lb. copy paper in a 500 sheet package and the corollary item is Brand Y, 32 lb. copy paper in a 500 sheet package.

At 212, the correlation application 536 may determine a conversion factor for a corollary item that has a different unit of measure from the identified input item, as described in further detail above. It should be noted that if multiple corollary items are determined, a conversion factor may be determined for each of the corollary items.

At 214, the correlation application 536 may adapt a quantity of a corollary item based on the conversion factor for that item. In some implementations, the correlation application 536 may adjust attributes associated with a corollary item by adjusting the quantity of the corollary item based on the conversion factor and a quantity for the first/received item (e.g., received as an input at 202). For example, the correlation application 536 may determine that an invoice includes 5 boxes of packages of 10 ballpoint pens each and that a corollary item is in packages of 5 ballpoint pens, so that the conversion factor is 2. Accordingly, the correlation application 536 may multiply the quantity of boxes of the received item by the conversion factor (e.g., 5 boxes multiplied by a conversion factor of 2 equals 10 boxes of the corollary item). In some implementations, the correlation application 536 may compare the received item and the corollary item by dividing the quantity of the received item by the conversion factor. In some implementations, the correlation application 536 may determine a price per item of each of the received item and corollary item (e.g., a price per pen when the received item is in boxes of 10 pens and the corollary item is in boxes of 5 pens), which it may provide to the user at 218.

At 216, the correlation application 536 may adjust attribute(s) of the corollary item(s). For instance, the correlation application 536 may modify the price of the corollary item by multiplying the price by the conversion factor to account for a multiplication in quantity of the corollary item based on the conversion factor (e.g., if each package of 5 ballpoint pens costs $3 and a conversion factor is 5, the total for the requested quantity may be $15). It should be noted that corollary items that are an exact equivalent match (e.g., as determined at 210) may not be adjusted based on a conversion factor (e.g., because their conversion factor would effectively be 1).

In some implementations, the correlation application 536 may adjust the attributes associated with the corollary item based on defined parameters (e.g., a target price, target savings, a particular color, size, etc.) and the item description (e.g., received in the user input, recognized text in an image, etc.), for example, by adjusting a price of the corollary item based on the conversion factor and the quantity of the received item. In some instances, a target savings (e.g., as a value or as a percentage) may be determined per item or over a set of items (e.g., a set of corollary items corresponding to a set of items in one or more invoices). For example, if a target savings percent is 5%, the correlation application 536 may multiply the total cost of a corollary item (and/or a set of corollary items) by 0.95, although other implementations are possible.

At 218, the correlation application 536 may update a user interface based on the adapted corollary items. For example, the correlation application 536 may output the corollary items on a graphical user interface. In some instances, such as where multiple corollary items are determined for each item, the correlation application 536 may allow the user to filter and select from multiple of the corollary items/item matches. For example, the user may use various options for filtering corollary options, select a particular corollary item for one or more of the received items, for example, in a competitor's invoice, and prepare a competitive quote including the selected corollary items along with their prices and quantities (and/or other attributes).

Figure 3:
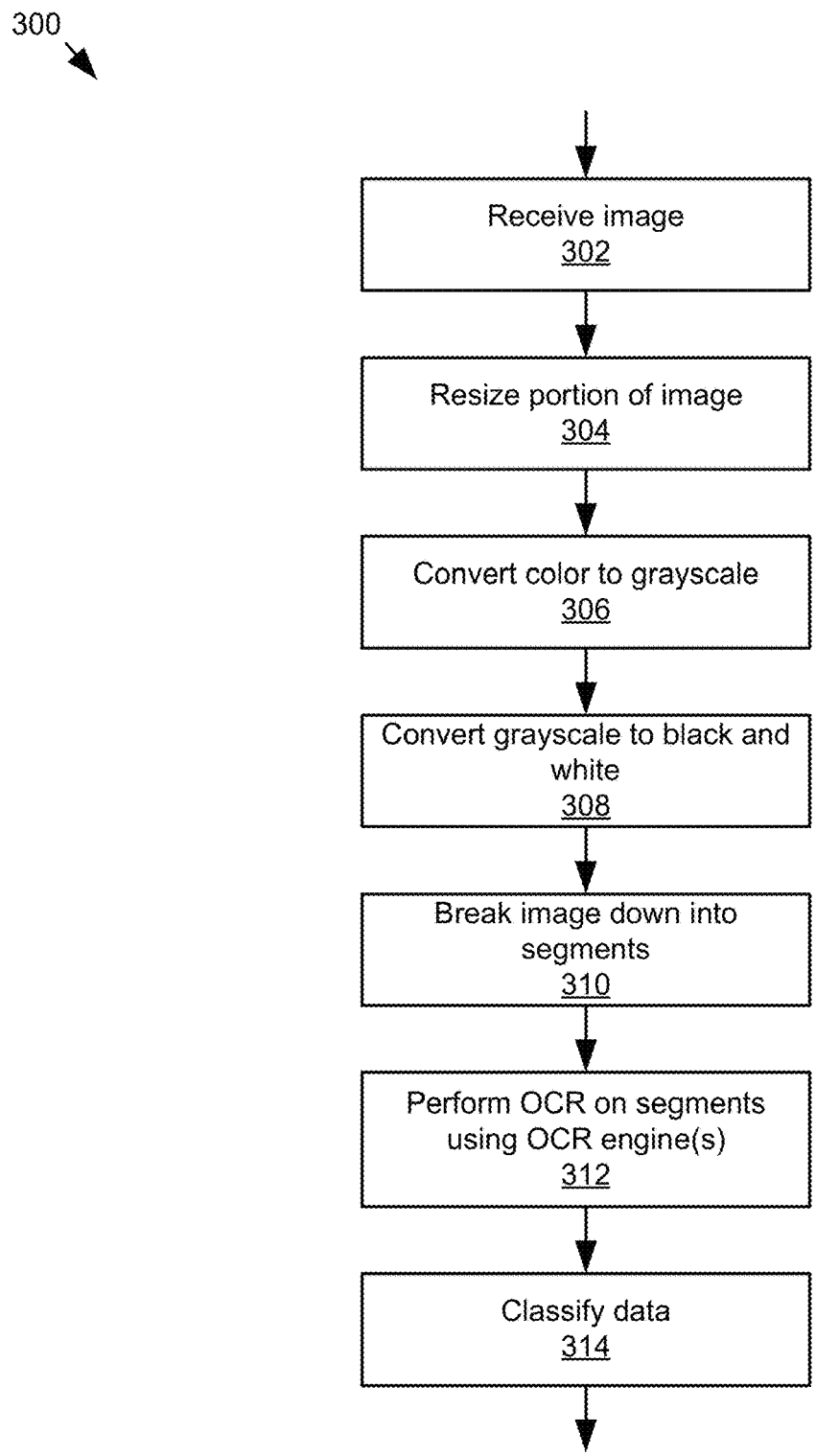
FIG. 3 is a flowchart of an example method for processing images to extract identification data of items.

FIG. 3 is a flowchart of an example method 300 for processing images to extract identification data of items. In some implementations, one or more of the operations of the method 300 may be used in addition to or in place of one or more operations of the methods 100 or 200 described above. For example, the method 300 may represent additional details and/or operations to the operations 102-110 described in reference to FIG. 1 and/or may provide information at 202 described in reference to FIG. 2. It should be noted that the method 300 may include fewer, additional, or different operations than illustrated herein, and that the operations described in reference to FIG. 3 are provided by way of example.

At 302, the correlation application 536 may receive an image. For example, the image may be read from a file uploaded by a user, captured using a camera coupled with the client device 606, scanned using an optical document scanner, etc.

In some implementations, at 304, the correlation application 536 may resize the image, such as by cropping the image, increasing or decreasing the size of the image, adjusting keystone, or performing other operations (e.g., automatically or based on user input) on the image. In some implementations, the correlation application 536 may receive user input cropping the image to include a portion of the image that includes a document or particular area of a document. In some implementations, the correlation application 536 may automatically crop and/or adjust the keystone, etc., of a portion of the image using image analysis techniques, such as searching for the edges of a white document and removing everything outside of those edges.

It should be noted that resizing the image and/or selecting a portion of the image may be excluded from the method 300 without departing from the scope of the techniques described herein. Resizing the image or otherwise selecting a portion of the image may improve computational efficiency by reducing the area of the image searched by the correlation application 536 as well as reducing potential false positives.

In some implementations, at 306, the correlation application 536 may convert the image, or the portion thereof, to grayscale. For example, the correlation application 536 may reduce the image from color (e.g., red, green, blue, etc.) to grayscale.

In some implementations, at 308, the correlation application 536 may convert the grayscale to black and white. For example, the correlation application 536 may binarize the image including converting it from grayscale to black and white using a defined or determined threshold. In some instances, the correlation application 536 may also or alternatively remove shadows from the image.

In some implementations, at 310, the correlation application 536 may break the image down into segments. For example, the correlation application 536 may perform table parsing including breaking the image down into segments at a section level, line level, cluster level, page, level, etc.

In some implementations, at 312, the correlation application 536 may perform OCR on the segments, and/or the image using OCR engine(s). The correlation application 536 may send one or more of the segments, cells, or other portions of the image to one or more OCR engines, for example, based on strengths or capabilities of various OCR engines. For instance, the correlation application 536 may use Tesseract, Occupy, OmniPage, etc., to perform OCR on various segments of the image. In instances where multiple OCR engines are used, the correlation application 536 may weight and combine the results of each engine based on expected confidence in each engine and/or the results of that engine.

At 314, the correlation application 536 may classify the data based on the information recognized using OCR. For instance, the data may be classified based on a defined or determined format of the image, based on user input, and/or using a trained machine learning algorithm (e.g., a neural network). For example, the correlation application 536 may identify fields or cells and data within the fields, as described in further detail above.

FIGS. 4A-4G illustrate features and graphical user interfaces provided by, or in association with, the correlation application 536 for performing operations disclosed herein. FIGS. 4A-4G illustrate example graphical user interfaces on a desktop, web application, tablet application, or mobile application for receiving data to automatically determine corollary objects and adapt attributes of the corollary objects using the received data.

Figure 4A:
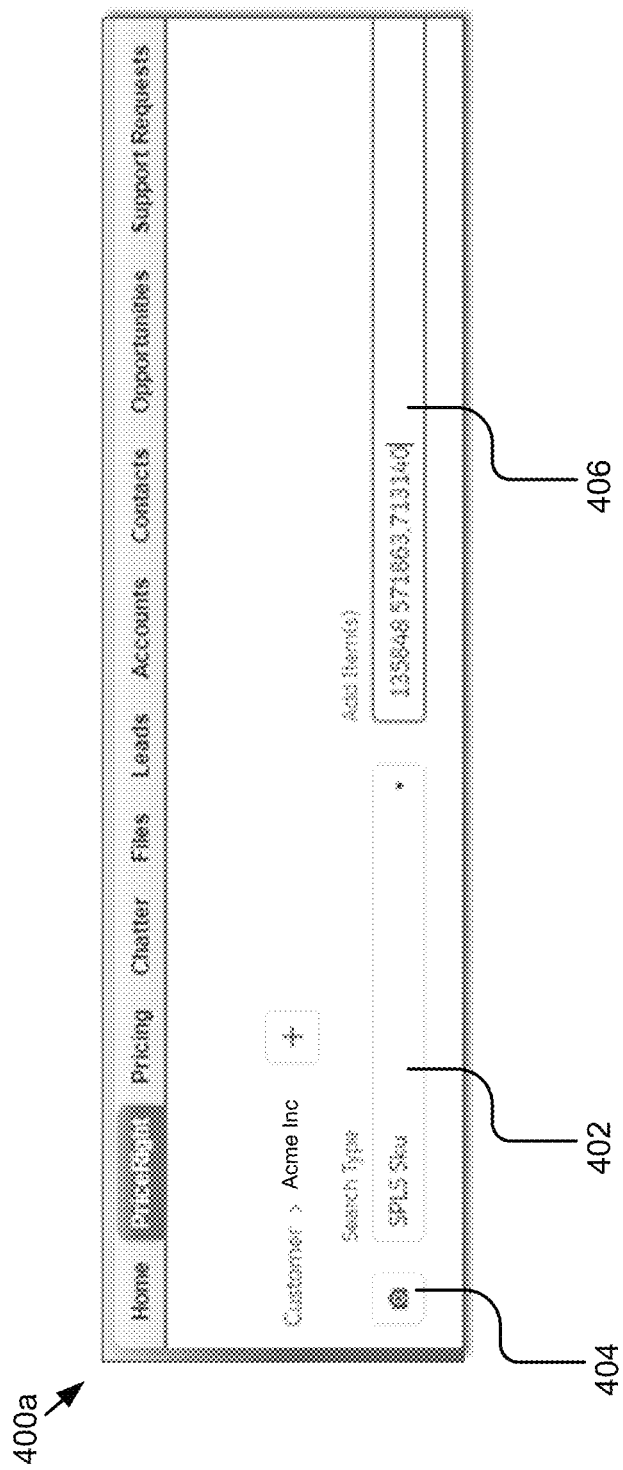

FIG. 4A illustrates an example graphical user interface 400a for receiving item descriptions. The example graphical user interface 400a may include an input field 406 for receiving item descriptions for one or more items. For instance, the input field 406 may receive SKUs in the input field. In some implementations, the interface 400a may also include a drop down menu 402 for receiving input indicating a type of item description. For example, the drop down menu 402 may define a party associated with a SKU, which may help the correlation application 536 identify the SKUs in the input field 406, or the drop down menu 402 may define that field 406 is to receive search terms, UPCs, etc.

In some implementations, the graphical user interface 400a may include an image selection component 404. For example, the image selection component may allow a user to upload and/or capture an image, as described elsewhere herein.

Figure 4B:
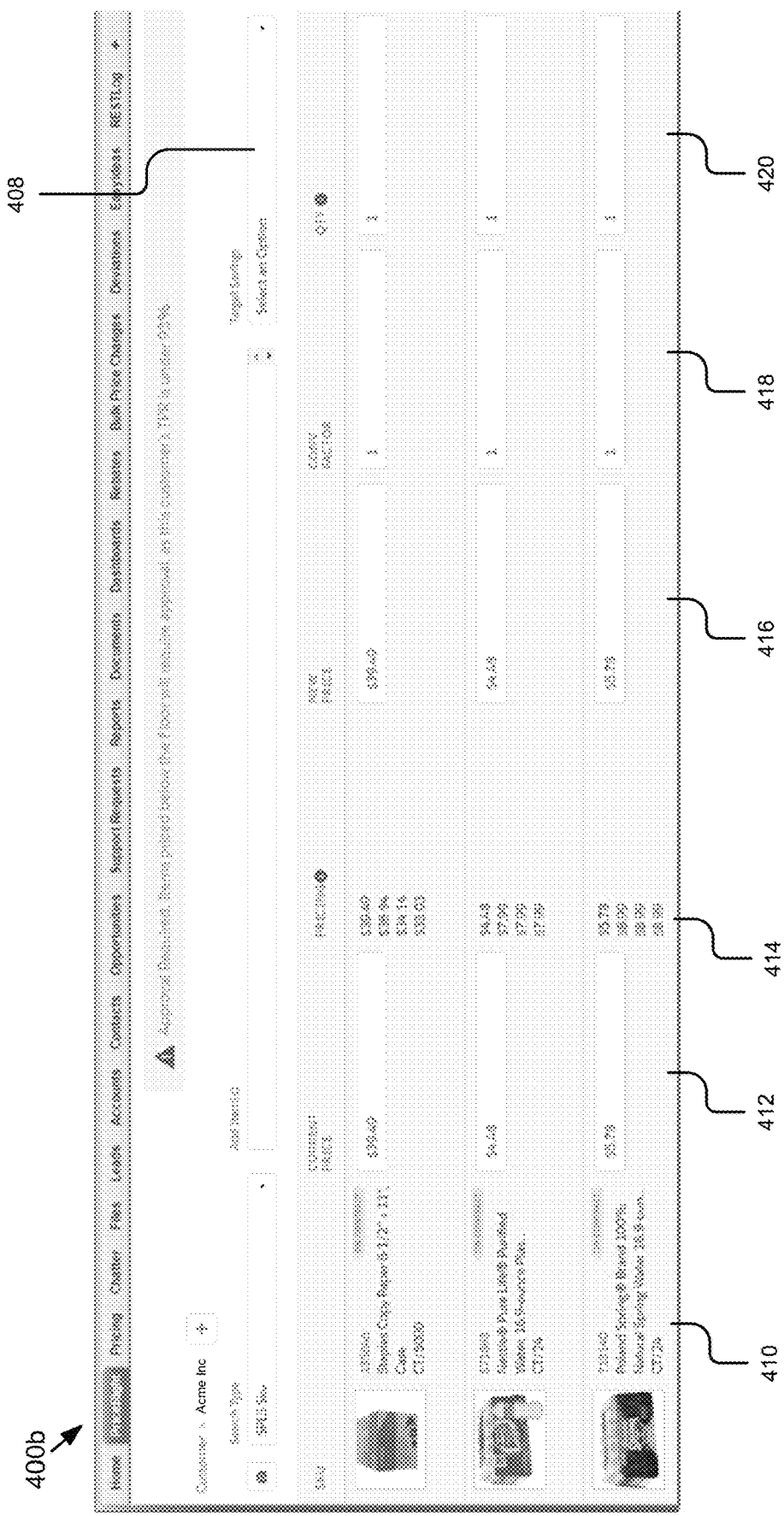

FIG. 4B illustrates an example graphical user interface 400b for displaying and, in some instances, modifying items. For instance, the interface 400b may be displayed based on the items added via the input field 406 referenced in FIG. 4A. The interface 400b may list exact and/or corollary items 410 based on the input items.

In some implementations, the interface 400b may list a current price 412, comparable pricing (e.g., of competitors, for other clients, of corollary items, etc.) 414, an adjusted price 416 (e.g., as adjusted, for example, as described at 416 in FIG. 2), a conversion factor 418, a quantity 420, etc., for one or more of the listed items. The interface 400b may also include data fields representing extended price, savings percentage per item, target total savings, etc., for example. In some implementations, the interface 400b may additionally allow a user to edit the items, filter items, correlate the list with a quote or customer, add or modify an item description, edit a quantity, or perform other operations.

FIG. 4B may be used for defining and, in some instances, determining (automatically or via manual override) prices and target savings for an invoice and/or per item in the invoice. The graphical user interface may be automatically populated with customer and/or invoice information specific to the customer and invoice. In some implementations, the graphical user interface includes a list of items. The list of items may have associated thereto a standard price, an MSRP, a list of prices offered to the same or different customers in the past, pricing parameters, etc. A user can select an option for a target savings (e.g., using the graphical element 408), as described herein, to maximize profitability while balancing the target savings.

Figure 4C:
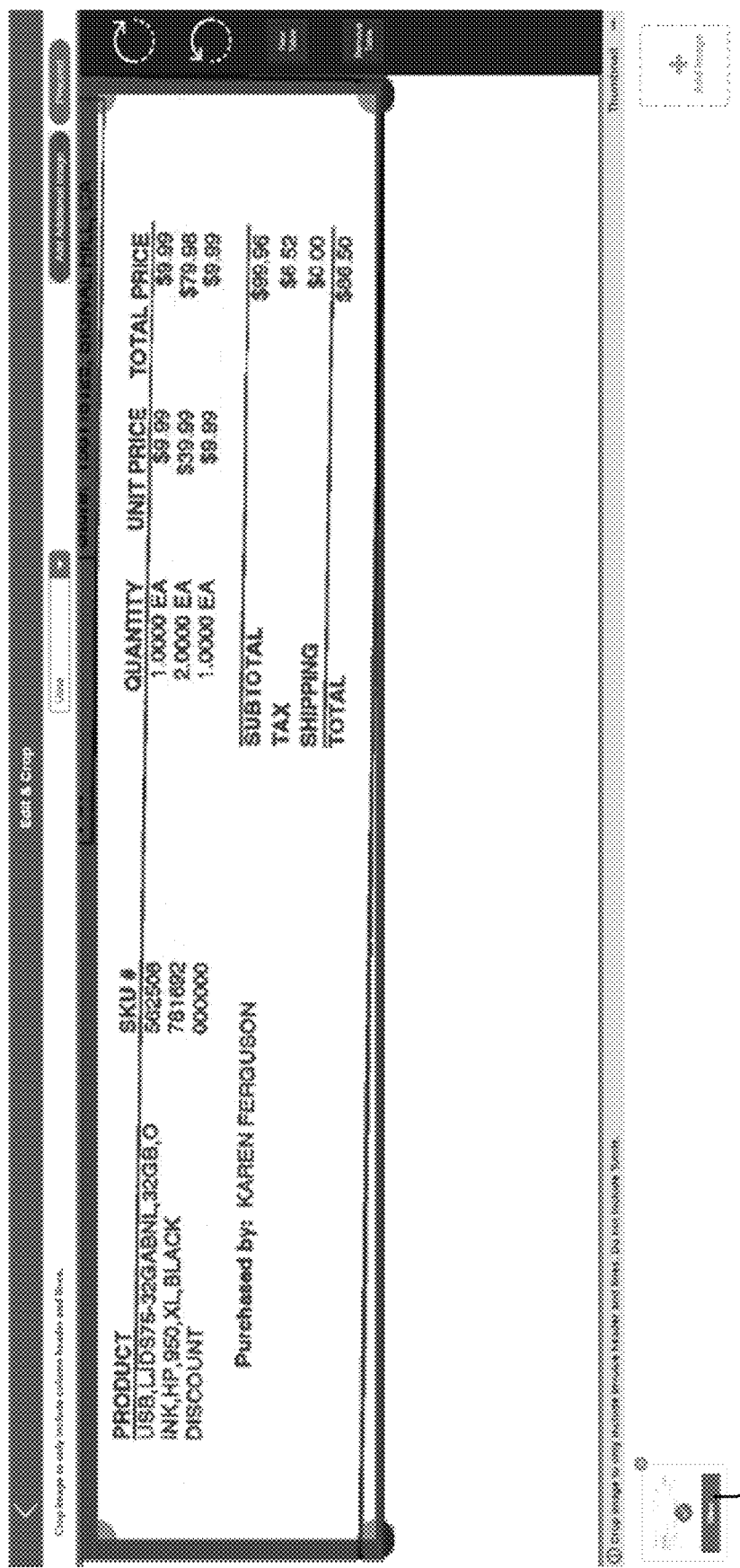
Figure 4D:
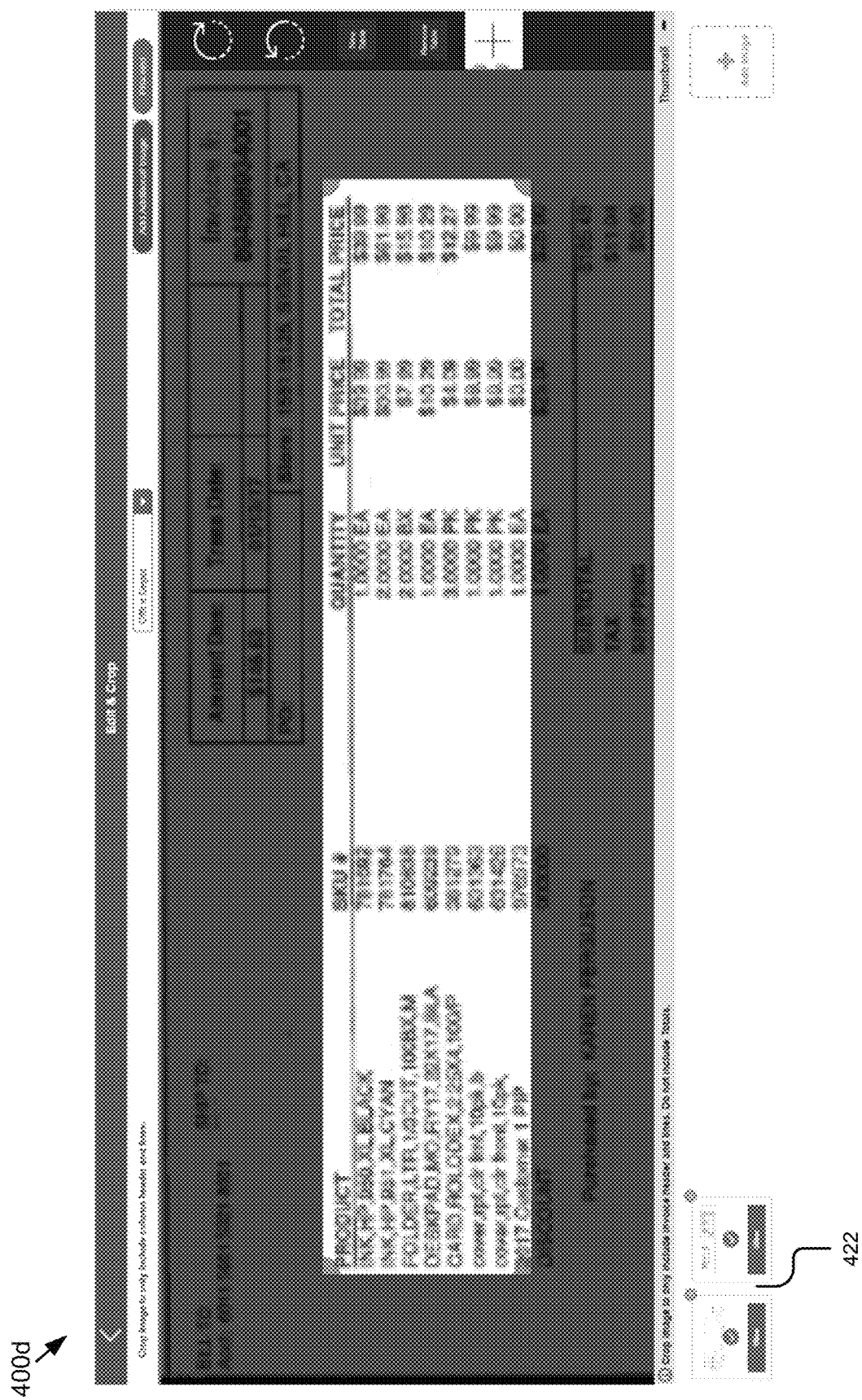

FIGS. 4C and 4D illustrate example graphical user interfaces 400c and 400d, respectively. As illustrated, and as discussed above, items may be added manually, by uploading a document, or by uploading or capturing an image of an invoice or receipt. The user may edit and/or crop the image to select a portion of the image including item identification, quantities, and/or prices. For instance, the example interfaces 400c and 400d illustrate portions of images cropped including various item information, such as product description, SKU numbers, quantities, unit prices, and total prices. The interfaces 400c and 400d may also include graphical elements 422 indicating that one or more images have already been added to the correlation application 536 (e.g., including items to be processed and/or added to a quote according to the techniques described herein). In some implementations, the images added may be processed together, for example, using the techniques described in reference to FIG. 3. The processed results may be displayed with each image on a separate tab or screen, or may be combined into a single interface.

In some implementations, the interfaces 400c and 400d may be used for entering competitor items for cross-reference/correlation of items over multiple invoices. For example, multiple invoices can be scanned. In some implementations, as described above, scanning images or taking photographs of invoices can be guided to improve picture quality. For example, the correlation application 536 may automatically evaluate image quality and request that the user improve image quality by changing the tilt, lighting, focus, etc., of the image. In some implementations, the interfaces 400c and 400d may automatically, or in response to user input, resize an image, crop an image, adjust an alignment or keystone, or perform other image analysis, as described in further detail above.

Figure 4E:
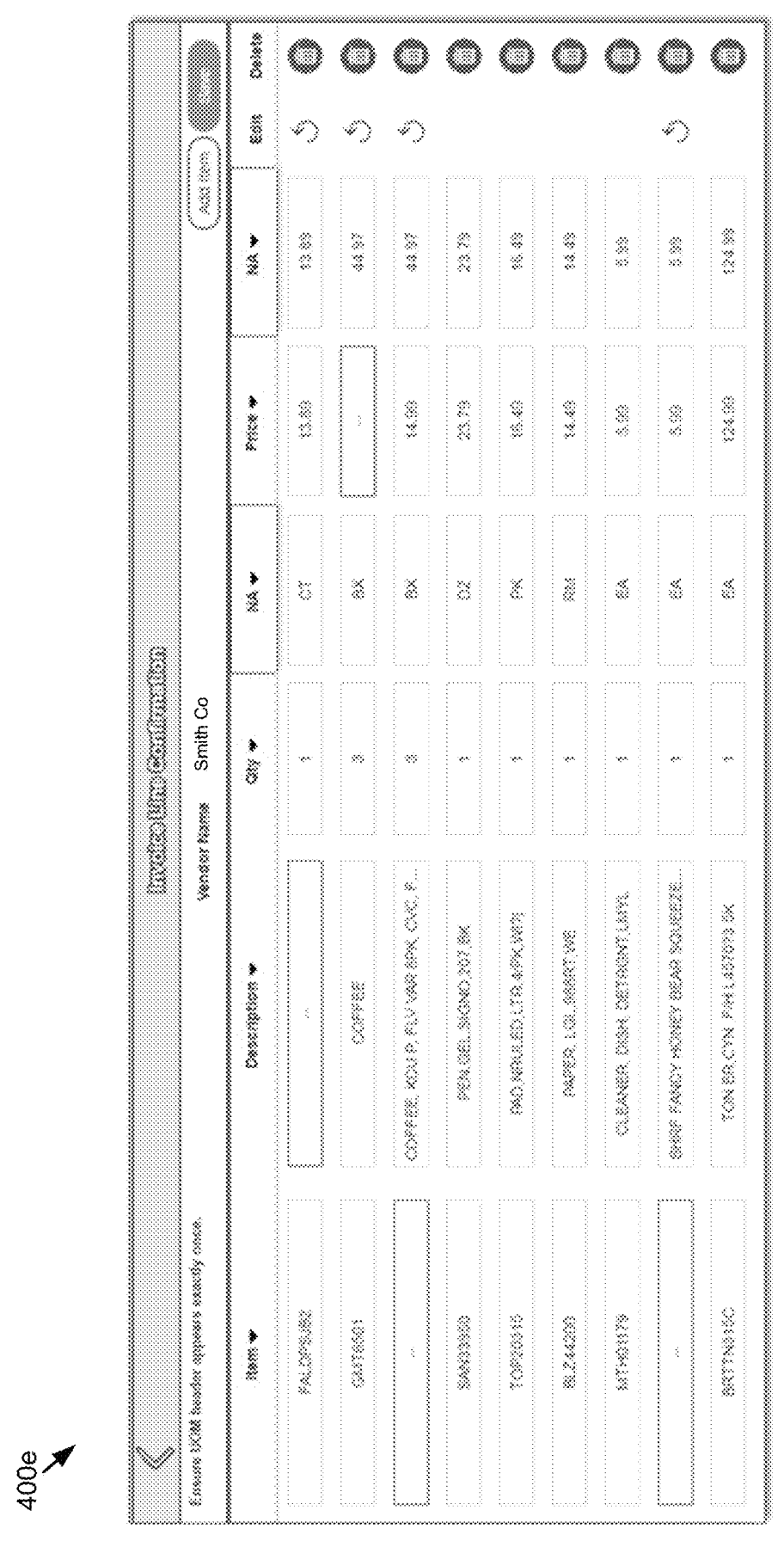

FIG. 4E illustrates an example graphical user interface 400e for manually entering and/or verifying an automatically determined (e.g., via image recognition described above) list of items, prices, quantities, etc. In some instances, items received from image analysis or manual entry may be displayed in the interface 400e. The interface 400e can further be used to manage, edit, and delete, etc., items from the list. In some implementations, columns of the interface can be customized to display relevant attributes. For example, the interface 400e may include columns including item identifiers, descriptions, quantities, conversion factors, units of measurement, price, total price, target savings, source company or vendor, competitor price(s), or other values. These and other values may be customized or edited, used to sort and/or filter the list, or perform other operations, as described herein.

Figure 4F:
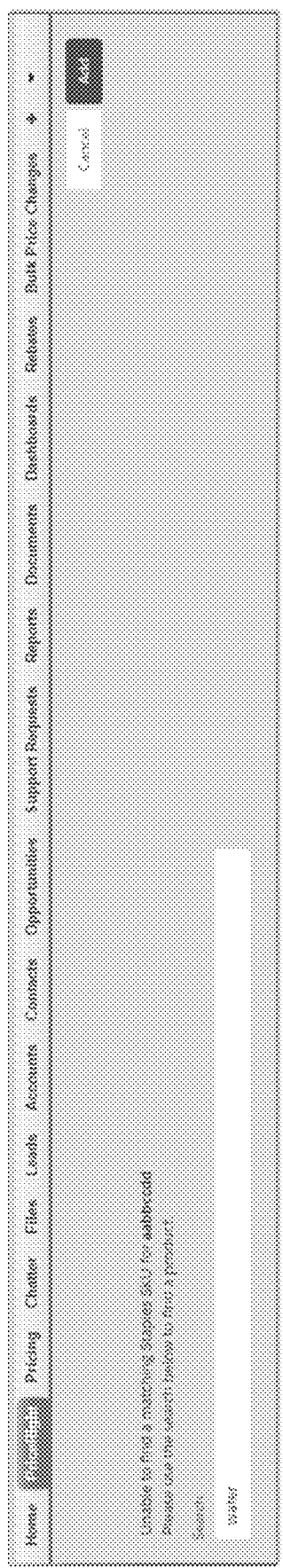
Figure 4G:
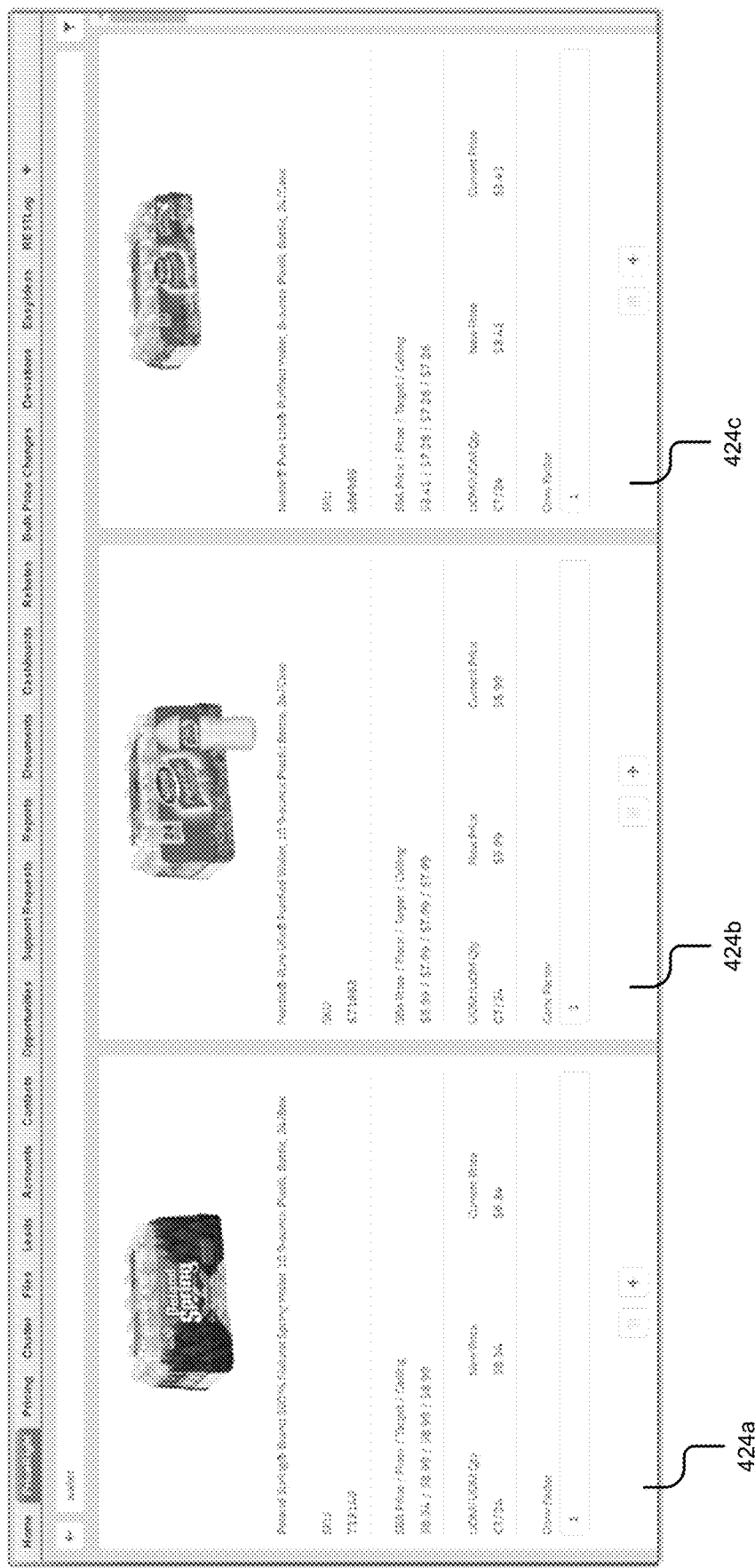

It should be noted that although the items and their associated attributes are described and illustrated in reference to FIG. 4E as being in a list format, they may additionally or alternatively be rendered in a grid or other format, for example, as illustrated in reference to FIG. 4G.

In some implementations, where multiple of the same item are determined from different invoices, the items may be combined into a single line or may be kept separate.

FIG. 4F illustrates an example graphical user interface 400f for cross-referencing or determining corollary items when exact (or within a threshold level of similarity) corollary items are not found. For instance, in response to an item not being found, the correlation application 536 may display a message requesting that the user search for the item.

FIG. 4G illustrates an example graphical user interface 400g including a list of corollary items displayed in a grid format. For instance, the interface 400g may be displayed as a search result for the search performed in the interface 400f described in reference to FIG. 4F. As illustrated, the interface 400g may include graphical elements 424a, 424b, and 424c, including a summary of attributes for the items. The graphical elements 424 are illustrated and described in further detail in reference to FIG. 4H.

Figure 4H:
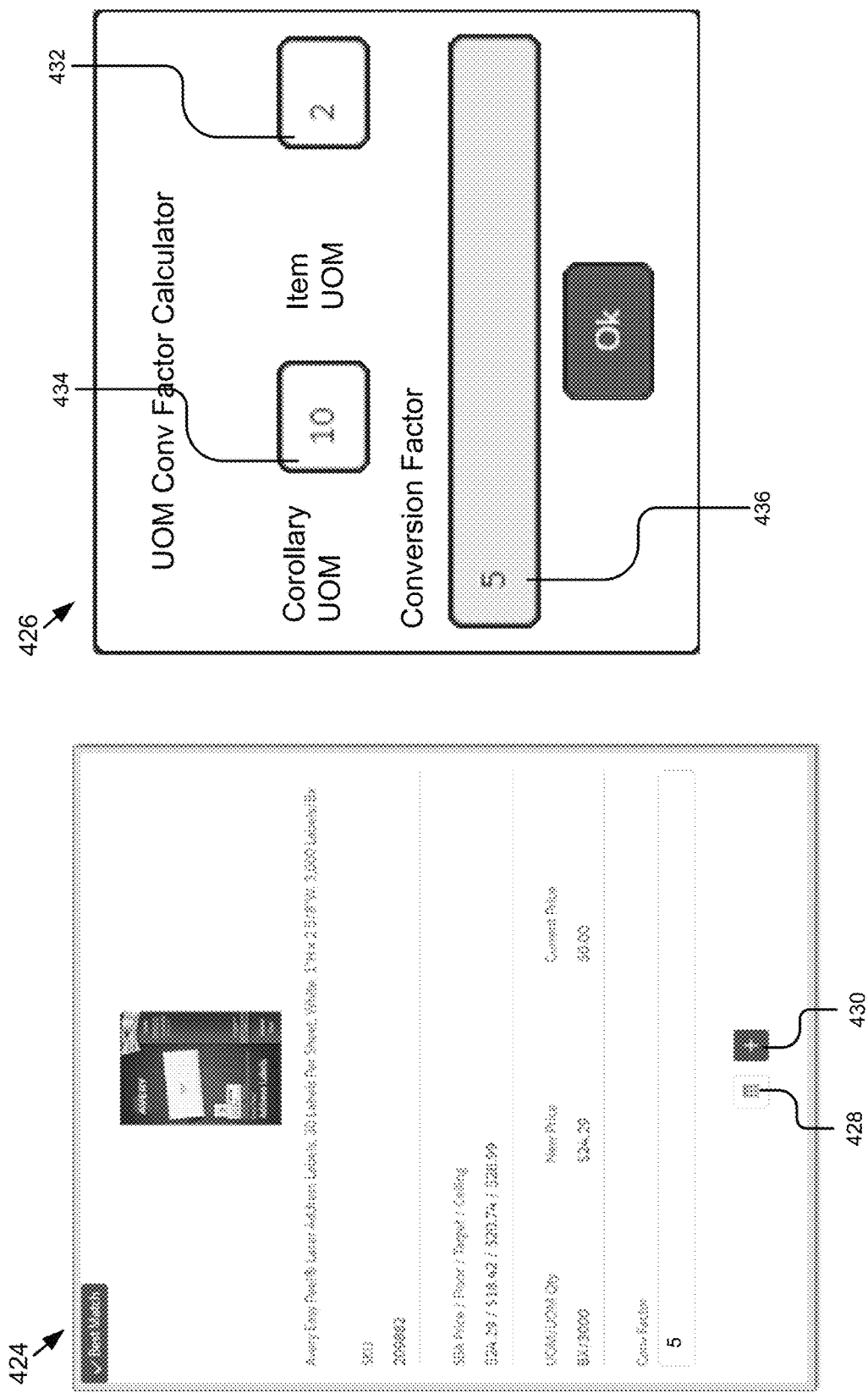

FIG. 4H illustrates an example graphical element 424, including a summary of an item, and a conversion factor calculator 426. In the illustrated example, the graphical element 424 may include a selectable calculator element 428 that, when selected, may display the conversion factor calculator 426 (e.g., as an overlay or adjacent to 424). In some instances, the graphical element 424 may also include a selectable button 430 for adding the item represented by the graphical element 424 to the list and/or quote, as described above.

In the illustrated implementation, the conversion factor calculator 426 may be auto-filled by the correlation application 536 to include a unit of measurement of a reference item 432, a unit of measurement of a corollary item 434, and a conversion factor 436. In some instances, one or more of the fields 432, 434, and 436 may be editable by the user.

Figure 5:
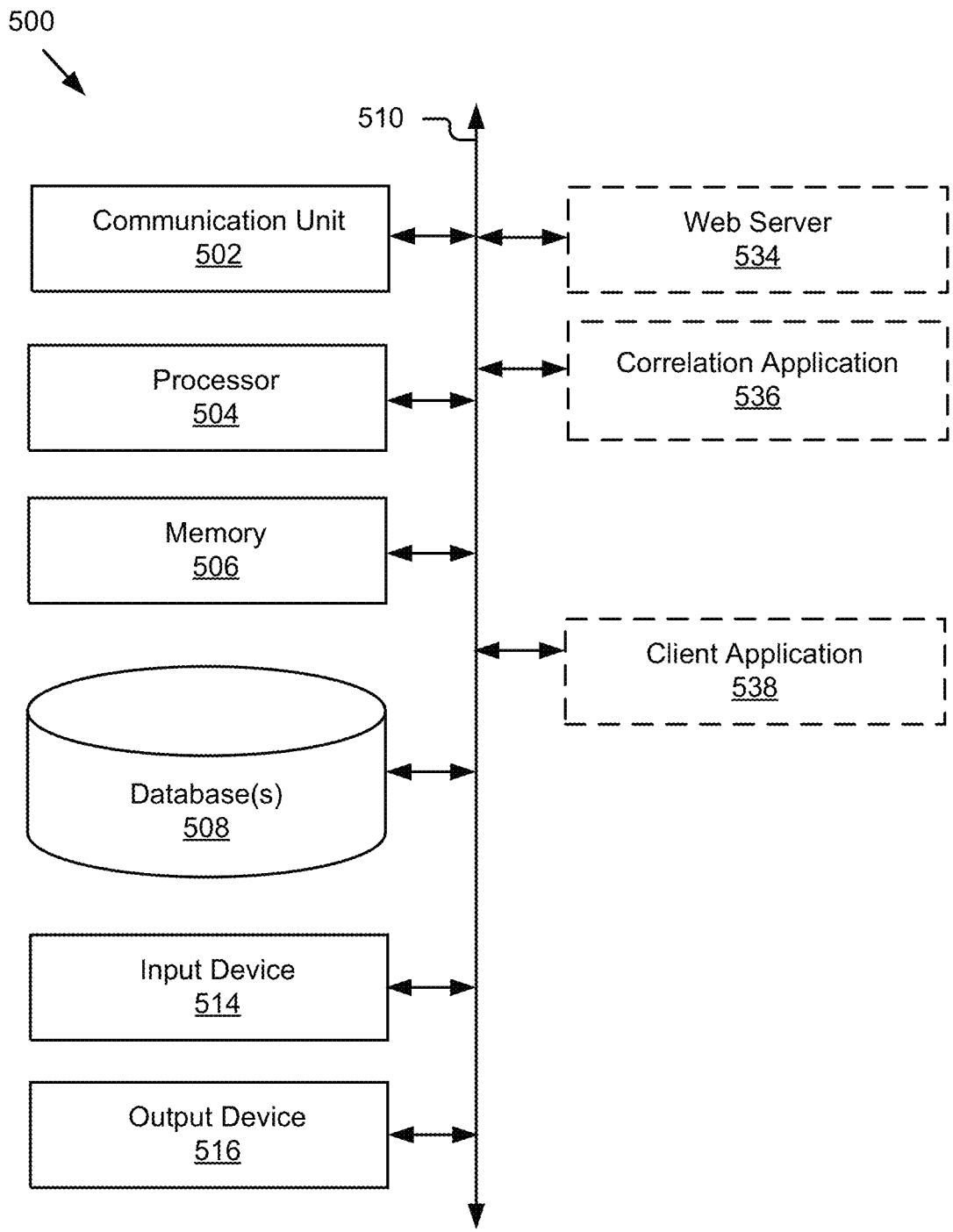
FIG. 5 is a block diagram of an example computing device for executing code and routines according to the technology described herein.
Figure 6:
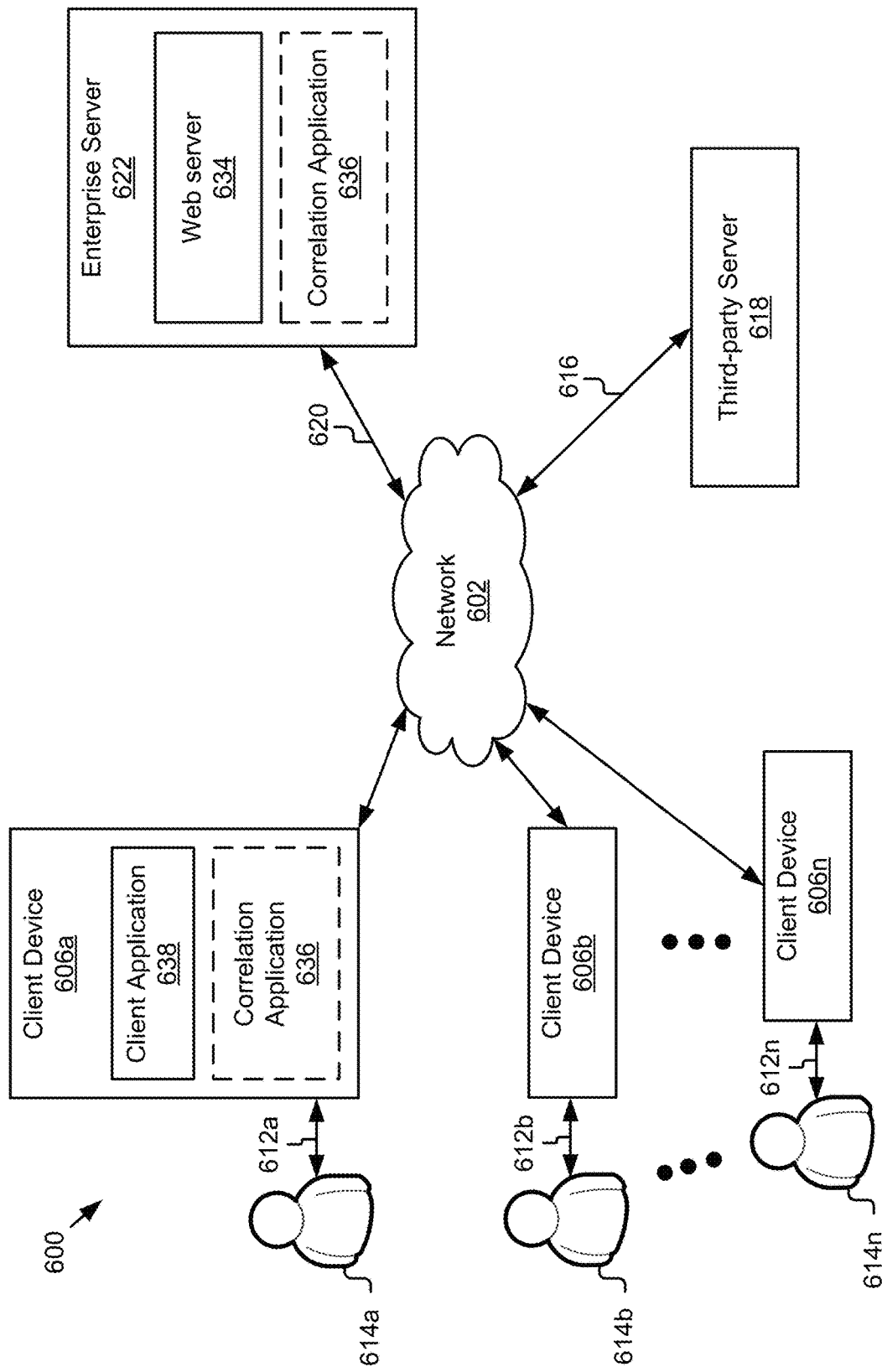
FIG. 6 is a block diagram of an example system for parsing data to automatically determine corollary objects and adapt attributes of the corollary objects using the data.

An example computing system 500 of the technology is depicted in FIG. 5. This computing system 500 may represent the computer architecture of a client device 606, a third-party server 618, and/or an enterprise server 622, as depicted in FIG. 6, and may include different components depending on the implementation being represented.

As depicted in FIG. 5, the computing system 500 may include one or more of a web server 534, a correlation application 536, and a client application 538, depending on the configuration. For instance, a client device 606 may include one or more of the client application 538, the correlation application 536, and/or components thereof, although it should be understood that other configurations are also possible, such as configurations where the client application 538 and the correlation application 536 are combined into a single entity or further distributed into additional components. The enterprise server 622 may include the web server 534, the correlation application 536, and/or components thereof, the database(s) 508, etc., although other configurations are also possible and contemplated.

The client devices 606 may also store and/or operate other software, such as a client application 538, a correlation application 536, operating system, other applications, etc., that may be configured to interact with the enterprise server 622 via the network 602.

The client device 606 includes one or more computing devices having data processing and communication capabilities. The client device 606 may couple to and communicate with other client devices 606 and the other entities of the system 600 via the network 602 using a wireless and/or wired connection. Examples of client devices 606 may include mobile phones, tablets, laptops, desktops, netbooks, server appliances, servers, virtual machines, TVs, etc. The system 600 may include any number of client devices 606, including client devices of the same or different type.

The web server 534 includes computer logic executable by the processor 504 to receive, process, and respond to content requests. The web server 534 may include an HTTP server, a REST (representational state transfer) service, or other suitable server type. The web server 534 may receive content requests (e.g., page requests, order requests, other requests (e.g., HTTP), etc.) from client devices 606, cooperate with the correlation application 536 to determine the content, retrieve and incorporate data from the database(s) 508, format the content, and provide the content to the client devices 606. In some instances, the web server 534 may format the content using a web language and provide the content to a corresponding client application 538 for processing and/or rendering to the user for display, although other variations are also possible.

The web server 534 may be coupled to the database(s) 508 to store retrieve, and/or manipulate data stored therein and may be coupled to the correlation application 536 to facilitate its operations. For example, the web server 534 may allow a user on a client device 606 to communicate with the correlation application 536.

The correlation application 536 includes computer logic executable by the processor 504 to parsing data to automatically determine corollary objects and adapt attributes of the corollary objects using the data as well as provide other operations described herein. The correlation application 536 may store and provide access to item information (e.g., images, descriptions, categories, specifications, reviews, ratings, retailers, prices, historically offered prices, quantities, attributes, approval criteria, parameters, etc.) in the item data 142 in the database(s) 508.

The correlation application 536 may also receive, manage, analyze, store, and provide access to inventory, sales, account, and item data. The correlation application 536 may communicate with the web server 534 to facilitate its operations and may be coupled to the database(s) 508 to store retrieve, and/or manipulate data stored therein. For example, the correlation application 536 may retrieve item data from a third-party server 618 and store it in the database(s) 508.

The correlation application 536 may include software including logic executable by the processor 504 to perform its respective acts, although in further embodiments the correlation application 536 may be implemented in hardware (one or more application specific integrated circuits (ASICs) coupled to the bus 510 for cooperation and communication with the other components of the system 500; sets of instructions stored in one or more discrete memory devices (e.g., a PROM, FPROM, ROM) that are coupled to the bus 510 for cooperation and communication with the other components of the system 500; a combination thereof; etc.).

The client application 538 includes computer logic executable by the processor 504 on a client device 606 to provide for user interaction, receive user input, present information to the user via a display, and send data to and receive data from the other entities of the system 600 via the network 602. In some implementations, the client application 538 may generate and present user interfaces based at least in part on information received from the correlation application 536 and/or the web server 534 via the network 602. In some implementations, the client application 538 includes a web browser and/or code operable therein, a customized client-side application (e.g., a dedicated mobile app), a combination of both, etc. Example interfaces that can be displayed by the client application 538 are shown in FIGS. 4A-4G.

The web server 534, the correlation application 536, and/or the client application 538 may require users to authenticate using known web authentication protocols in order to determine if they have permission to invoice an order to a customer account, as discussed further herein.

As depicted, the computing system 500 may include a processor 504, a memory 506, a communication unit 502, an output device 516, an input device 514, and database(s) 508, which may be communicatively coupled by a communication bus 510. The computing system 500 depicted in FIG. 5 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 500 may include various operating systems, sensors, additional processors, and other physical configurations. Although, for purposes of clarity, FIG. 5 only shows a single processor 504, memory 506, communication unit 502, etc., it should be understood that the computing system 500 may include a plurality of one or more of these components.

The processor 504 may execute software instructions by performing various input, logical, and/or mathematical operations. The processor 504 may have various computing architectures to method data signals including, for example, a complex instruction set computer (CISC) architecture, a reduced instruction set computer (RISC) architecture, and/or an architecture implementing a combination of instruction sets. The processor 504 may be physical and/or virtual, and may include a single core or plurality of processing units and/or cores. In some implementations, the processor 504 may be capable of generating and providing electronic display signals to a display device, supporting the display of images, capturing and transmitting images, performing complex tasks including various types of feature extraction and sampling, etc. In some implementations, the processor 504 may be coupled to the memory 506 via the bus 510 to access data and instructions therefrom and store data therein. The bus 510 may couple the processor 504 to the other components of the computing system 500 including, for example, the memory 506, the communication unit 502, the input device 514, the output device 516, and the database(s) 508.

The memory 506 may store and provide access to data to the other components of the computing system 500. The memory 506 may be included in a single computing device or a plurality of computing devices. In some implementations, the memory 506 may store instructions and/or data that may be executed by the processor 504. For example, the memory 506 may store one or more of a web server 534, a correlation application 536, a client application 538, and their respective components, depending on the configuration. The memory 506 is also capable of storing other instructions and data, including, for example, an operating system, hardware drivers, other software applications, databases, etc. The memory 506 may be coupled to the bus 510 for communication with the processor 504 and the other components of computing system 500.

The memory 506 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 504. In some implementations, the memory 506 may include one or more of volatile memory and non-volatile memory (e.g., RAM, ROM, hard disk, optical disk, etc.). It should be understood that the memory 506 may be a single device or may include multiple types of devices and configurations.

The bus 510 can include a communication bus for transferring data between components of a computing device or between computing devices, a network bus system including the network 602 or portions thereof, a processor mesh, a combination thereof, etc. In some implementations, the web server 534, correlation application 536, client application 538, and various other components operating on the computing system 500 (operating systems, device drivers, etc.) may cooperate and communicate via a communication mechanism included in or implemented in association with the bus 510. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 502 may include one or more interface devices (I/F) for wired and wireless connectivity among the components of the system 600. For instance, the communication unit 502 may include various types known connectivity and interface options. The communication unit 502 may be coupled to the other components of the computing system 500 via the bus 510. The communication unit 502 may be electronically communicatively coupled to the network 602 (e.g., wiredly, wirelessly, etc.). In some implementations, the communication unit 502 can link the processor 504 to the network 602, which may in turn be coupled to other processing systems. The communication unit 502 can provide other connections to the network 602 and to other entities of the system 600 using various standard communication protocols.

The input device 514 may include any device for inputting information into the computing system 500. In some implementations, the input device 514 may include one or more peripheral devices. For example, the input device 514 may include a keyboard, a pointing device, microphone, an image/video capture device (e.g., camera), a touch-screen display integrated with the output device 516, etc.

The output device 516 may be any device capable of outputting information from the computing system 500. The output device 516 may include one or more of a display (LCD, OLED, etc.), a printer, a haptic device, audio reproduction device, touch-screen display, etc. In some implementations, the output device is a display which may display electronic images and data output by the computing system 500 for presentation to a user 106. In some implementations, the computing system 500 may include a graphics adapter (not shown) for rendering and outputting the images and data for presentation on output device 516. The graphics adapter (not shown) may be a separate processing device including a separate processor and memory (not shown) or may be integrated with the processor 504 and memory 506.

The database(s) are information source(s) for storing and providing access to data. The data stored by the database(s) 508 may organized and queried using various criteria including any type of data stored by them, such as a customer identifier, business identifier, order ID, IP address, rewards account number, item identifier, item attributes, item name, etc. The database(s) 508 may include file systems, data tables, documents, databases, or other organized collections of data. Examples of the types of data stored by the database(s) 508 may include invoice data, item data, business account data, purchase data, user profile data, etc.

The components of the computing system 500 may be communicatively coupled by the bus 510 and/or the processor 504 to one another. In some implementations, the components 534, 536, and/or 538 may include computer logic (e.g., software logic, hardware logic, etc.) executable by the processor 504 to provide their acts and/or functionality. In any of the foregoing implementations, these components 534, 536, and/or 538 may be adapted for cooperation and communication with the processor 504 and the other components of the computing system 500.

The database(s) 508 may be included in the computing system 500 or in another computing system and/or storage system distinct from but coupled to or accessible by the computing system 500. The database(s) 508 can include one or more non-transitory computer-readable mediums for storing the data. In some implementations, the database(s) 508 may be incorporated with the memory 506 or may be distinct therefrom. In some implementations, the database(s) 508 may store data associated with a database management system (DBMS) operable on the computing system 500. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

Methods are described herein; however, it should be understood that the methods are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods may in some cases be iterative, and thus repeated as many times as necessary generate the results described herein. Further the ordering of the operations in the methods is provided by way of example and it should be understood that various operations may occur earlier and/or later in the method without departing from the scope thereof.

FIG. 6 is a block diagram of an example system 600 for parsing data to automatically determine corollary objects and adapt attributes of the corollary objects using the data. The illustrated system 600 may include a client device 606a . . . 606n (also referred to herein individually and/or collectively as 606), a third-party server 618, and an enterprise server 622, which are electronically communicatively coupled via a network 602 for interaction with one another, although other system configurations are possible including other devices, systems, and networks. For example, the system 600 could include any number of client devices 606, third-party servers 618, enterprise servers 622, and other systems and devices. The client devices 606a . . . 606n, and their components, may be coupled to the network 602 via signal lines 612a . . . 612n. The enterprise server 622 and its components may be coupled to the network 602 via signal line 620. The third-party server 618 and its components may be coupled to the network 602 via signal line 612. The users 614a . . . 614n may access one or more of the devices of the system 600. For example, as depicted, a user 614a may access and/or interact with the client device 606a as illustrated by line 612a, a user 614b may access and/or interact with the client device 606b as illustrated by line 612b, and a user 614n may access and/or interact with the client device 606n as illustrated by line 510n.

The network 602 may include any number of networks and/or network types. For example, the network 602 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

A plurality of client devices 606a . . . 606n are depicted in FIG. 6 to indicate that the enterprise server 622 and its components may services to a multiplicity of users 614a . . . 614n on a multiplicity of client devices 606a . . . 606n. In some implementations, a single user may use more than one client device 606, which the enterprise server 622 may receive and manage data associated with the user and use to perform its acts and/or functions as discussed elsewhere herein.

The enterprise server 622 and the third-party server 618 have data processing, storing, and communication capabilities, as discussed elsewhere herein. For example, the servers 622 and/or 618 may include one or more hardware servers, server arrays, storage devices and/or systems, etc. In some implementations, the servers 622 and/or 618 may include one or more virtual servers, which operate in a host server environment. As depicted, the enterprise server 622 may include the correlation application 536 and the web server 534, as discussed elsewhere herein.

Third-party server 618 can host services such as a third-party application (not shown), which may be individual and/or incorporated into the services provided by the enterprise server 622. In some implementations, the third-party application provides additional acts and/or information such as browsing history, tracking information, profile data, shopping data, web analytics, etc., to the enterprise server 622 for storage in the database(s) 508.

It should be understood that the system 600 illustrated in FIG. 6 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
receiving, by a computer, one or more images;
performing, by the computer, text recognition to determine recognized text in the one or more images;
determining, by the computer, data cells containing information associated with a first item;
classifying, by the computer, one or more of the determined data cells;
identifying, by the computer, key cells in the determined data cells based on the classification of the one or more determined data cells;
determining, by the computer, one or more first attributes of the first item based on information contained in the key cells;
determining, by the computer, a second item based on a correlation of a common attribute between the one or more first attributes of the first item and one or more second attributes of the second item, the second item including an interchangeable item to the first item; and
adjusting, by the computer, a certain attribute of the one or more second attributes associated with the second item based on the certain attribute being different from the one or more first attributes.

2. The computer-implemented method of claim 1, further comprising:
  receiving, by the computer, user input identifying a portion of the one or more images; and
  performing, by the computer, the text recognition on the portion of the one or more images to determine the recognized text.

3. The computer-implemented method of claim 1, wherein classifying the one or more of the determined data cells includes identifying a category of data in the one or more of the determined data cells based on a particular format, the particular format representing an expected layout of information in the one or more images.

4. The computer-implemented method of claim 1, wherein classifying the one or more of the determined data cells includes identifying a category of data in the one or more of the determined data cells using a neural network trained using a plurality of images and classified data cells.

5. The computer-implemented method of claim 1, wherein determining correlations between the information contained in the key cells and the second item includes identifying the second item based on the identified key cells.

6. The computer-implemented method of claim 5, wherein identifying the second item based on the identified key cells includes cross-referencing the information contained in the key cells with information relating to the second item to identify the second item.

7. The computer-implemented method of claim 5, wherein determining the second item based on the correlation of the common attribute includes determining a conversion factor representing a correlation of a first unit of measure of the first item and a second unit of measure of the second item.

8. The computer-implemented method of claim 7, wherein adjusting the certain attribute of the one or more second attributes associated with the second item includes adjusting a quantity of the second item based on the conversion factor and a quantity of the first item.

9. The computer-implemented method of claim 8, wherein adjusting the certain attribute of the one or more second attributes associated with the second item based on defined parameters and the recognized text includes adjusting a price of the second item based on the conversion factor and the quantity of the first item.

10. The computer-implemented method of claim 1, wherein the one or more images includes multiple images, the multiple images including multiple invoices, each of the multiple invoices including at least one item.

11. A system comprising:
  one or more processors; and
  a non-transitory computer memory storing instructions that, when executed by the one or more processors, cause the system to:
    receive one or more images;
    perform text recognition to determine recognized text in the one or more images;
    determine data cells containing information associated with a first item;
    classify one or more of the determined data cells;
    identify key cells in the determined data cells based on the classification of the one or more determined data cells;
    determine one or more first attributes of the first item based on information contained in the key cells;
    determine a second item based on a correlation of a common attribute between the one or more first attributes of the first item and one or more second attributes of the second item, the second item including an interchangeable item to the first item; and
    adjust a certain attribute of the one or more second attributes associated with the second item based on the certain attribute being different from the one or more first attributes.

12. The system of claim 11, wherein the instructions, when executed by the one or more processors, further cause the system to
  receive user input identifying a portion of the one or more images, and
  perform the text recognition on the portion of the one or more images to determine the recognized text.

13. The system of claim 11, wherein classifying the one or more of the determined data cells includes identifying a category of data in the one or more of the determined data cells based on a particular format, the particular format representing an expected layout of information in the one or more images.

14. The system of claim 11, wherein classifying the one or more of the determined data cells includes identifying a category of data in the one or more of the determined data cells using a neural network trained using a plurality of images and classified data cells.

15. The system of claim 11, wherein determining correlations between the information contained in the key cells and the second item includes identifying the second item based on the identified key cells.

16. The system of claim 15, wherein identifying the second item based on the identified key cells includes cross-referencing the information contained in the key cells with information relating to the second item to identify the second item.

17. The system of claim 15, wherein determining the second item based on the correlation of the common attribute includes determining a conversion factor representing a correlation of a first unit of measure of the first item and a second unit of measure of the second item.

18. The system of claim 17, wherein adjusting the certain attribute of the one or more second attributes associated with the second item includes adjusting a quantity of the second item based on the conversion factor and a quantity of the first item.

19. The system of claim 18, wherein adjusting the certain attribute of the one or more second attributes associated with the second item based on defined parameters and the recognized text includes adjusting a price of the second item based on the conversion factor and the quantity of the first item.

20. The system of claim 11, wherein the one or more images includes multiple images, the multiple images including multiple invoices, each of the multiple invoices including at least one item.

* * * * *